(12) United States Patent
Abrari et al.

(10) Patent No.: US 10,385,695 B2
(45) Date of Patent: Aug. 20, 2019

(54) ROTOR FOR GAS TURBINE ENGINE

(71) Applicant: PRATT & WHITNEY CANADA CORP., Longueuil (CA)

(72) Inventors: Farid Abrari, Mississauga (CA); Nashed Youssef, Mississauga (CA); Andrew Marshall, Grand Valley (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 647 days.

(21) Appl. No.: 14/459,923

(22) Filed: Aug. 14, 2014

(65) Prior Publication Data

US 2016/0047245 A1 Feb. 18, 2016

(51) Int. Cl.
| | | |
|---|---|---|
| *F01D 5/02* | (2006.01) | |
| *F01D 5/04* | (2006.01) | |
| *F01D 5/34* | (2006.01) | |
| *B23P 15/04* | (2006.01) | |

(Continued)

(52) U.S. Cl.
CPC .............. *F01D 5/02* (2013.01); *B23P 15/04* (2013.01); *F01D 5/025* (2013.01); *F01D 5/043* (2013.01); *F01D 5/34* (2013.01); *F04D 29/26* (2013.01); *F04D 29/281* (2013.01); *F04D 29/284* (2013.01); *F05B 2230/60* (2013.01); *F05B 2280/50032* (2013.01); *F05D 2230/60* (2013.01); *F05D 2260/37* (2013.01); *F05D 2260/83* (2013.01); *F05D 2260/94* (2013.01);

(Continued)

(58) Field of Classification Search
CPC .... B23P 15/02; B23P 15/04; Y10T 29/49945; F01D 5/02; F01D 5/025; F01D 5/34; F01D 5/043; F05D 2230/60; F05D 2300/5021; F05D 2300/50212; F05D 2260/37; F05D 2260/83; F05D 2260/94; F05D 2260/941; F05B 2230/60; F05B 2280/5003; F05B 2280/50032; F04D 29/26; F04D 29/263; F04D 29/266; F04D 29/32; F04D 29/321; F04D 29/325; F04D 29/329; F04D 29/281; F04D 29/284
USPC ... 416/244 R, 244 A, 61, 182, 183, 185, 188
See application file for complete search history.

(56) References Cited

U.S. PATENT DOCUMENTS

| | | | | |
|---|---|---|---|---|
| 2,628,066 A | * | 2/1953 | Lombard | ................ F01D 5/021 416/216 |
| 3,982,852 A | * | 9/1976 | Andersen | ................ F01D 5/087 416/214 A |
| 4,787,821 A | | 11/1988 | Cruse et al. | |

(Continued)

FOREIGN PATENT DOCUMENTS

| | | |
|---|---|---|
| CN | 203362234 | 12/2013 |
| CN | 203362236 | 12/2013 |

(Continued)

*Primary Examiner* — Christopher Verdier
(74) *Attorney, Agent, or Firm* — Norton Rose Fulbright Canada LLP

(57) ABSTRACT

The gas turbine engine rotor can have a body having a solid-of-revolution-shaped portion centered around a rotation axis, the body defining an annular cavity centered around the rotation axis, the annular cavity penetrating into the body from an annular opening, the annular cavity extending between two opposite annular wall portions each leading to a corresponding edge of the opening; and at least one structural plate mounted to and extending between the two opposite annular wall portions and forming an interference fit therewith.

17 Claims, 5 Drawing Sheets

(51) Int. Cl.
  *F04D 29/26* (2006.01)
  *F04D 29/28* (2006.01)
(52) U.S. Cl.
  CPC ............... *F05D 2300/5021* (2013.01); *F05D 2300/50212* (2013.01); *Y10T 29/49945* (2015.01)

(56) References Cited

U.S. PATENT DOCUMENTS

| | | | |
|---|---|---|---|
| 5,501,575 A | 3/1996 | Eldredge et al. | |
| 5,842,831 A * | 12/1998 | Galke | F01D 5/08 416/198 A |
| 5,961,287 A * | 10/1999 | Cairo | F01D 5/02 416/208 |
| 6,499,953 B1 | 12/2002 | Bellerose et al. | |
| 7,448,221 B2 * | 11/2008 | Suciu | F01D 5/066 415/141 |
| 2006/0130456 A1 * | 6/2006 | Suciu | F01D 5/066 60/226.1 |
| 2007/0224047 A1 * | 9/2007 | Falk | F04D 29/284 416/97 R |
| 2009/0092494 A1 | 4/2009 | Cairo et al. | |
| 2014/0064946 A1 * | 3/2014 | Nielsen | F01D 5/06 415/199.5 |
| 2014/0250897 A1 * | 9/2014 | Ayers | F01D 11/22 60/772 |
| 2016/0215792 A1 * | 7/2016 | Hiester | F04D 25/045 |

FOREIGN PATENT DOCUMENTS

| | | | |
|---|---|---|---|
| FR | 2913064 | 8/2008 | |
| GB | 617472 A * | 2/1949 | ............. F01D 5/187 |

* cited by examiner

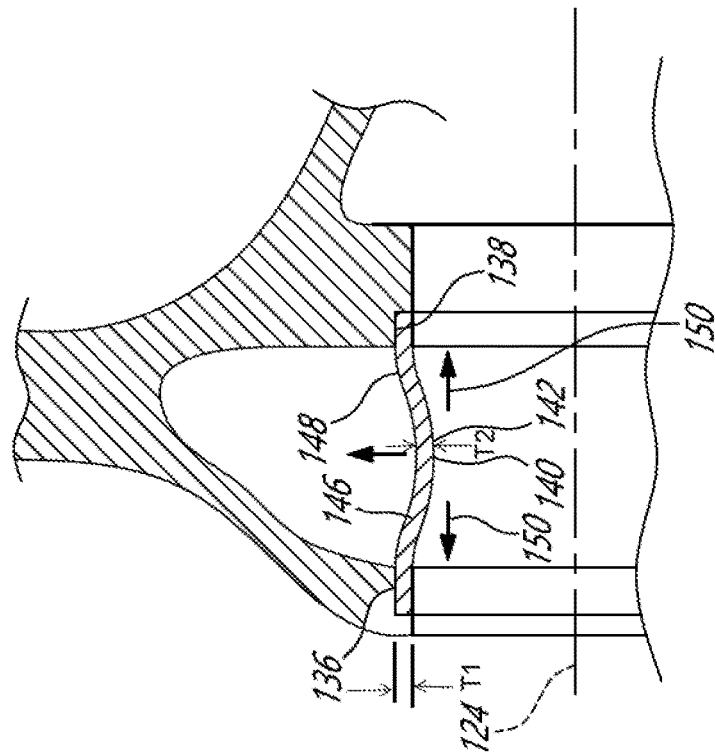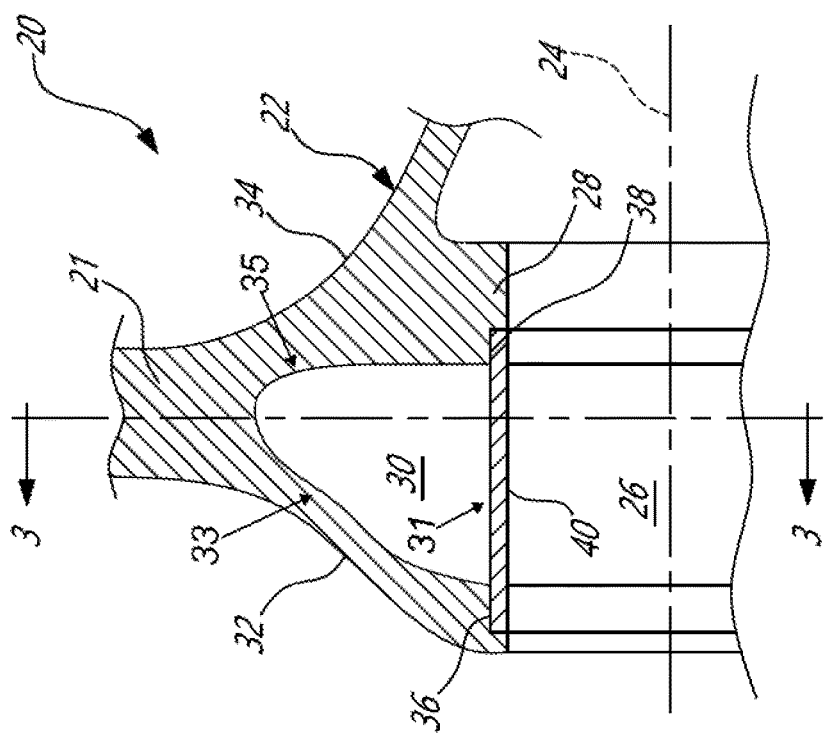

ROTOR FOR GAS TURBINE ENGINE

TECHNICAL FIELD

The application relates generally to gas turbine engines and, more particularly, to rotors thereof.

BACKGROUND

Rotors of gas turbine engines, which may include or form part of an impeller, fan, compressor, turbine, etc., are often subjected to significant centrifugal forces stemming from the relatively high rotational speeds at which gas turbine engines are operated. The rotors are engineered to withstand these structurally harsh operating conditions and while static effects are relatively straightforward to deal with, dynamic effects can pose particular engineering challenges.

Minimizing weight is a permanent concern in the aeronautics industry in general, and is a particularly significant concern in the case of rotors since the weight of rotors can influence the extent of the rotor dynamic effects which may need to be dealt with by further additional weight at the shaft. While attempts to limit the amount of material used in the rotor, and thus limit its associated weight, have been made, there remain practical limitations to the designing of the rotor shape however, such as limitations imposed by the context of commercial-scale production for instance.

Although known rotors and associated methods are satisfactory to a certain degree, there always remains room for improvement. Particularly, any weight savings which can be achieved is desirable in aero gas turbine applications.

SUMMARY

There is provided a gas turbine engine rotor comprising a body having a solid-of-revolution-shaped portion centered around a rotation axis, the body defining an annular cavity centered around the rotation axis, the annular cavity penetrating into the body from an annular opening, the annular cavity extending between two opposite annular wall portions each leading to a corresponding edge of the opening; and at least one structural plate mounted to and extending between the two opposite annular wall portions and forming an interference fit therewith.

There is also provided a gas turbine engine comprising a shaft adapted to rotate about an axis of rotation and a rotor fixed to the shaft, the rotor including a body having a solid-of-revolution-shaped portion centered around a rotation axis and having an annular cavity centered around the rotation axis, the annular cavity penetrating into the body from an annular opening, the annular cavity extending between two opposite annular wall portions each leading to a corresponding edge of the opening; and at least one structural plate mounted to and extending between the two opposite annular wall portions and forming an interference fit therewith.

There is further provided a method of manufacturing a rotor of a gas turbine engine comprising: providing a rotor body, the rotor body being solid and having a solid-of-revolution-shaped portion centered around a rotation axis of the rotor; forming an annular cavity in the rotor body, the annular cavity extending between two wall portions of the rotor body; and mounting at least one structural plate between the two wall portions with an interference fit.

Further details of these and other aspects of the present invention will be apparent from the detailed description and figures included below.

There is further provided a gas turbine engine rotor comprising a body having a solid-of-revolution-shaped portion centered around a rotation axis, the body having a bore extending axially along the rotation axis and configured for receiving a shaft therein, the bore defined within a peripheral surface of the body circumferentially extending around the rotation axis, the body defining an annular cavity extending between two opposite annular wall portions of the body, the two opposite annular wall portions extending away from radially-inner ends thereof and joining each other at a radially-outer end of the annular cavity, the radially-inner ends of the two opposite annular wall portions defining seats located radially outwardly from the peripheral surface and radially inwardly from the annular cavity, the annular cavity extending radially outwardly from the seats, the gas turbine engine rotor further having a plurality of structural plates circumferentially interspaced from one another by corresponding spacings, the plurality of structural plates extending radially relative to the rotation axis from inner surfaces facing the rotation axis to opposed outer surfaces, the plurality of structural plates having opposed ends extending axially along axial lengths of the seats and extending radially from the inner surfaces to the outer surfaces, the opposed ends mounted to and extending between the seats in the two opposite annular wall portions and forming an interference fit therewith, the opposed ends of the plurality of structural plates being entirely disposed radially between the peripheral surface and the seats relative to the rotation axis.

There is further provided a gas turbine engine comprising a shaft adapted to rotate about a rotation axis and a rotor fixed to the shaft, the rotor including a body having a solid-of-revolution-shaped portion centered around the rotation axis, the body having a bore extending axially along the rotation axis and receiving the shaft therein, the bore defined within a peripheral surface of the body circumferentially extending around the rotation axis, the body having an annular cavity extending between two opposite annular wall portions of the body, the two opposite annular wall portions extending away from radially-inner ends thereof and joining each other at a radially-outer end of the annular cavity, the radially-inner ends of the two opposite annular wall portions defining seats located radially outwardly from the peripheral surface and radially inwardly from the annular cavity, the annular cavity extending radially outwardly from the seats, the rotor further having a plurality of structural plates circumferentially interspaced from one another by corresponding spacings, the plurality of structural plates extending radially relative to the rotation axis from inner surfaces facing the rotation axis to opposed outer surfaces, the plurality of structural plates having opposed ends extending axially along axial lengths of the seats and extending radially from the inner surfaces to the outer surfaces, the opposed ends mounted to and extending between the seats in the two opposite annular wall portions and forming an interference fit therewith, the opposed ends of the plurality of structural plates outside of the annular cavity and outside of the bore.

There is further provided a method of manufacturing a rotor of a gas turbine engine comprising: providing a rotor body, the rotor body being solid and having a solid-of-revolution-shaped portion centered around a rotation axis of the rotor, the rotor body having a bore extending axially along the rotation axis and configured for receiving a shaft therein, the bore defined within a peripheral surface circumferentially extending around the rotation axis; forming an annular cavity in the rotor body, the annular cavity extending between two wall portions of the rotor body, the two wall portions extending away from radially-inner ends thereof and joining each other at a radially-outer end of the annular cavity, forming seats in the radially-inner ends of the two wall portions, the seats located radially outwardly from the peripheral surface and radially inwardly from the annular cavity, the annular cavity extending radially outwardly from the seats; and mounting a plurality of structural plates between the seats in the two wall portions with an interference fit, disposing opposed ends of the plurality of structural plates entirely radially between the peripheral surface and the seats relative to the rotation axis, the opposed ends extending axially along axial lengths of the seats and extending radially from inner surfaces to outer surfaces of the plurality of structural plates, and circumferentially interspacing the plurality of structural plates from one another by corresponding spacings.

DESCRIPTION OF THE DRAWINGS

Reference is now made to the accompanying figures, in which:

FIG. 2A is a fragmented longitudinal cross-sectional view of a rotor of the gas turbine engine of FIG. 1, with FIG. 2B being an alternate embodiment to the rotor of FIG. 2A;

DETAILED DESCRIPTION

Figure 1:
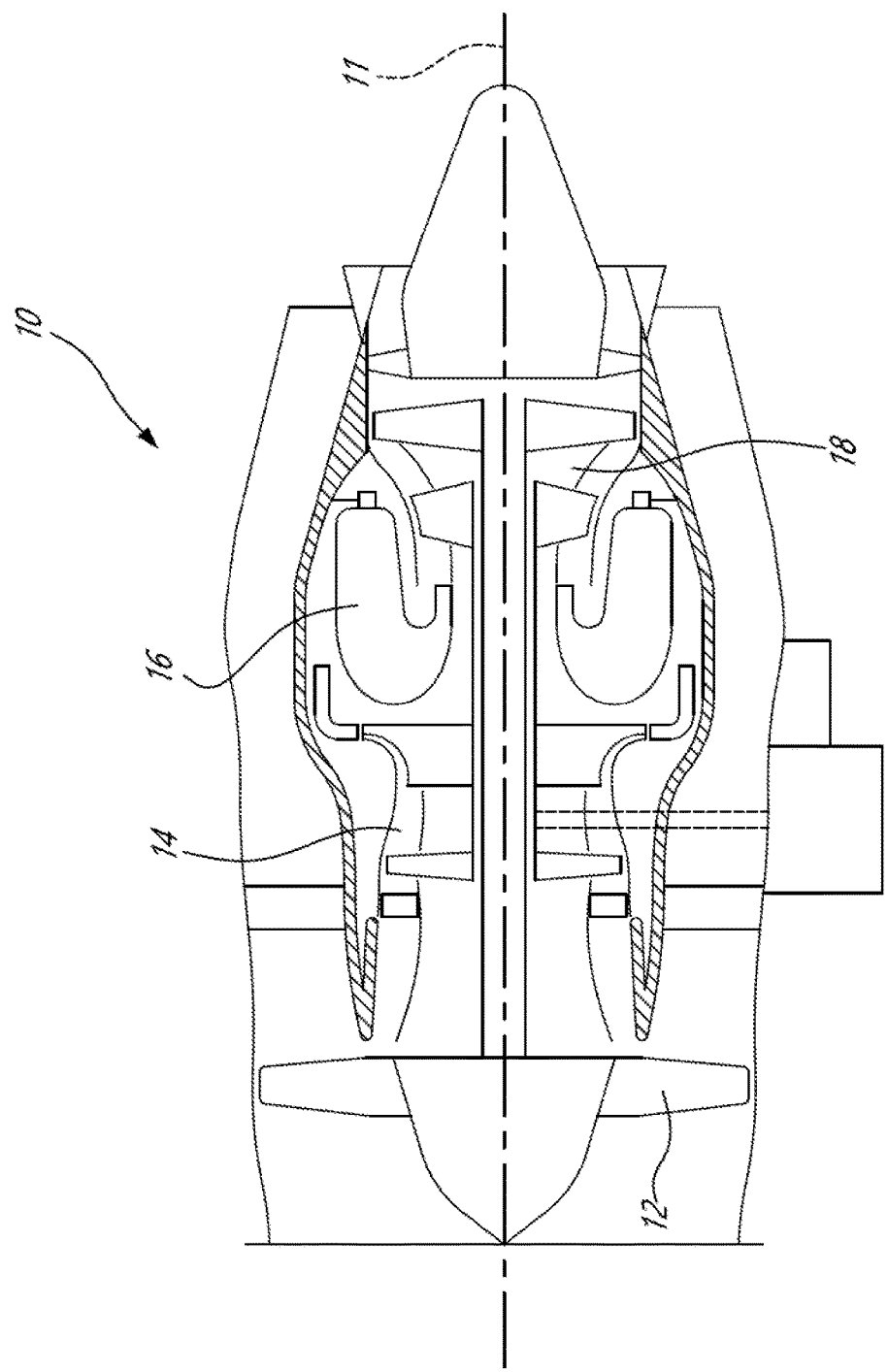
FIG. 1 is a schematic cross-sectional view of a gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The fan 12, the compressor 14, and the turbine section 18 rotate about a rotational axis 11 of the engine 10.

Turning now to FIG. 2A, a first example embodiment of a rotor 20 which can be adapted to the gas turbine engine 10 is shown. The rotor 20 can be any one of a plurality of rotary gas turbine engine components such as an impeller, a fan, a compressor component or a turbine component, to name a few examples.

The rotor 20 has a body 22 which generally has a solid of revolution shape (except for the rotor blades) centered around a rotation axis 24 thereof. In this embodiment, the rotor 20 has an optional axial bore 26 to receive a shaft therein. Although only partially shown in FIG. 2A, a plurality of rotor blades 21 extend radially outwardly from the body 22 of the rotor 20. The radially-inner (i.e. near the axis 24) portion of the rotor 20 can thus be referred to as the hub 28. In this embodiment, the weight of the rotor 20 is addressed (i.e. limited) in part by the presence of an annular cavity 30 which is generally surrounded by a hollow toroidal-shaped structure of the body 22 of the rotor 20. This annular cavity 30 may be enclosed by the body 22 of the rotor 20 on all sides except for the circumferential, radially inwardly opening, gap defined between axially spaced apart flanges 32 and 34 of the hub 28, as will be seen.

The annular cavity 30 can be said to penetrate into the body 22 from the axial bore 26 in the radially-outward direction. The annular cavity 30 can be formed as part of the body 22 of the rotor 20 and since it forms a partially open void shape in the body 22, the body 22 can still be formed by casting, forging, machining, by additive material manufacturing, and/or by welding two or more body portions together, for instance.

In the illustrated 'impeller-type' embodiment, the wall portions 33, 35 forming the axially-opposite walls of the annular cavity 30 correspond to a forward annular flange 32 and a rearward annular flange 34 of the rotor 20. A first seat 36 is formed in the radially-inner portion of the forward annular flange 32, and a second seat 38 is formed in the radially-inner portion of the rearward annular flange 34, and the annular opening 31 extends axially between the first seat 36 and the second seat 38. One or more structural components, which will be referred to herein as structural plates 40 for the sake of convenience, is/are interference-fitted between the two seats 36, 38 and used in compression therebetween to impart a force acting to maintain the radially-inner ends of the two annular flanges 32, 34 away from one another. This feature is significant as during rotation of the rotor 20 at operating speeds, the centrifugal effect can be such that it tends to 'stretch' the rotor in the radial orientation (i.e. normal to the axis 24), thereby bringing the radially inner ends, and seats 36, 38, toward one another. The structural plate(s) 40 acts in compression between the seats 36, 38 against this axially collapsing force in order, at least to a certain extent, to substantially maintain the structural shape of the rotor body 22 notwithstanding the forces due to the centrifugal effect. The shaped portions referred to above as 'seats' 36, 38, are optional, as in alternate embodiments, the structural plate(s) can be positioned in the annular cavity, directly against the wall portions 33, 35, for instance. In alternate embodiments, such as a fan embodiment for instance, the annular cavity can penetrate axially into the rotor body and the structural plate(s) can be in the radial orientation, for example.

This 'extending' force exerted by the structural plate(s) 40 onto the seats 36, 38 can be made to increase from the original interference-fitted state when the rotor is in operation to ensure that the structural plate(s) 40 remain(s) well fixed in place and/or oppose the growing, opposite, 'compressive' force stemming from the centrifugal effect.

In a first example, in an embodiment where the rotor 20 is subjected to a significant increase in temperature during operation, the material of the structural plate(s) 40 can be selected with a thermal expansion coefficient which leads to a greater thermal growth of the plate 40 than that of the rotor body 22 itself. For instance, if the rotor body 22 is made of a single, uniform, material, the structural plates(s) 40 can be made of a material having a thermal expansion coefficient which is greater than the thermal expansion coefficient of the uniform material of the rotor body 22.

In a second example, the structural plate(s) can have a shape which dynamically reacts to the centrifugal effect by extending substantially axially. For instance, the embodiment shown in FIG. 2B shows a structural plate(s) 140 which has a radially-inwardly-curved axial-cross-section shape. In other words, it has a center portion 142 which is closer to the axis 124 than the two axial ends, or legs 146, 148, which rest in the seats 136, 138. When subjected to centrifugal force, the central portion 142 is driven radially-outwardly and the centrifugal force is partially transformed by this shape at the two axial ends into an axially directed extension force which pushes the seats 136, 138, and thus the flanges, away from one another, as shown by the arrows 150. Such a functional shape will be referred to herein as a splayed shape, for convenience. This centrifugal-extending function can further be increased or attenuated by increasing or decreasing, respectively, the weight of the central portion 142. To this end, in the embodiment of FIG. 2B, the central portion 142 has a thickness T2 greater than a thickness T1 of the axial ends or legs 146, 148.

The interference-fit of the structural plate(s) 40, 140 into and between the seats 36, 38, 136, 138 can be achieved by any suitable process known to persons of ordinary skill in this art, such as cold-fitting or press-fitting for instance. Cold-fitting is particularly suitable in embodiments where the thermal expansion coefficient of the structural plate(s) 40, 140 is greater than the thermal expansion coefficient of the body 22.

An interesting feature of the use of one or more structural plate(s) 40 in this manner is the possibility of leaving an aperture extending across the general location of the structural plate(s) 40. This can allow the cavity 30 to breathe (heat, water, oil), or even allow boroscopy inspection of the cavity 30 across the barrage of structural plate(s). The one or more structural plates themselves can be provided with apertures across their radial thickness, or apertures can be provided by leaving spacings between the circumferential edges of the one or more structural plates.

Figure 3:
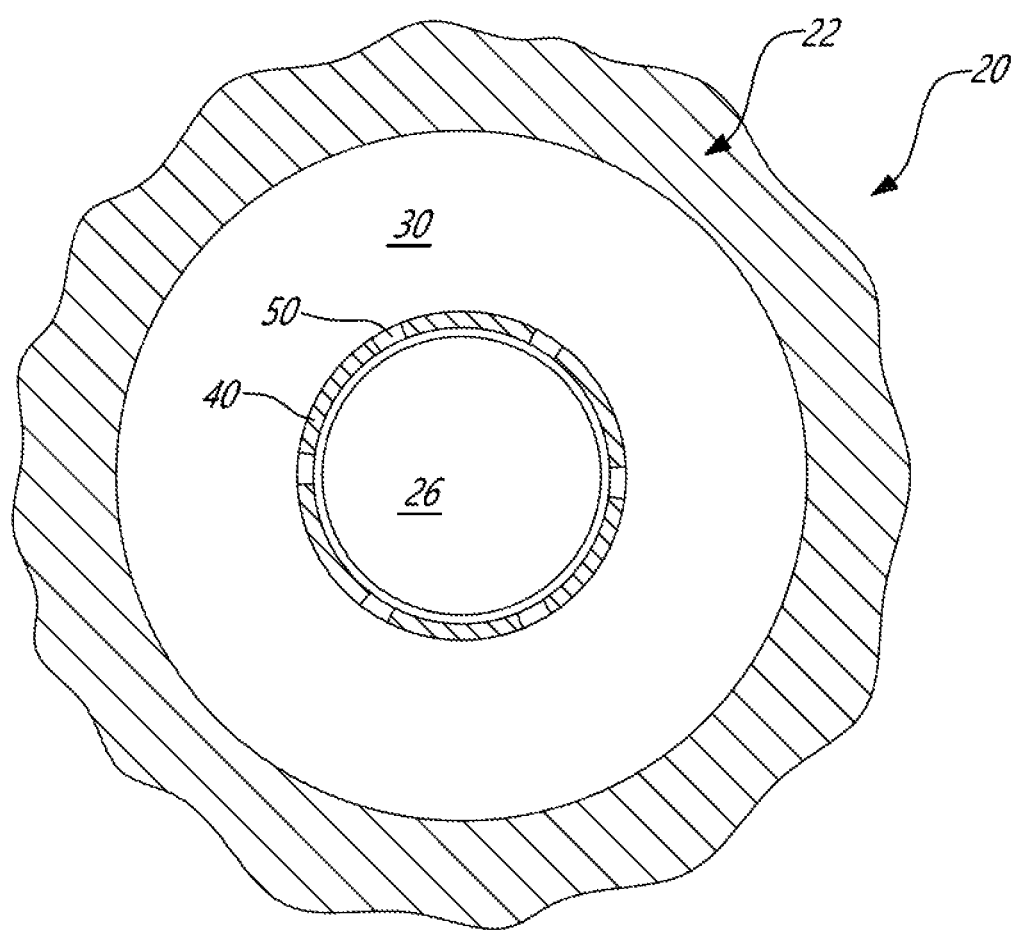
FIG. 3 is a cross-sectional view taken along lines 3-3 of FIG. 2A.

Referring to FIG. 3, which shows a transversal cross-section by opposition to the axial or longitudinal cross sections views of FIGS. 1 and 2, an embodiment is shown where six independent structural plates 40 are used in a circumferentially-interspaced manner, leaving six corresponding spacings 50 therebetween. The plates 40 may be circumferentially equally spaced apart, such that the circumferential spacings 50 are also equally spaced apart. In this example, at least one of the spacings 50 is specifically sized in a manner to allow inspection of the annular cavity 30 from the axial bore 26 using a given piece of boroscopy equipment, without removing the structural plates 40.

Figure 4:
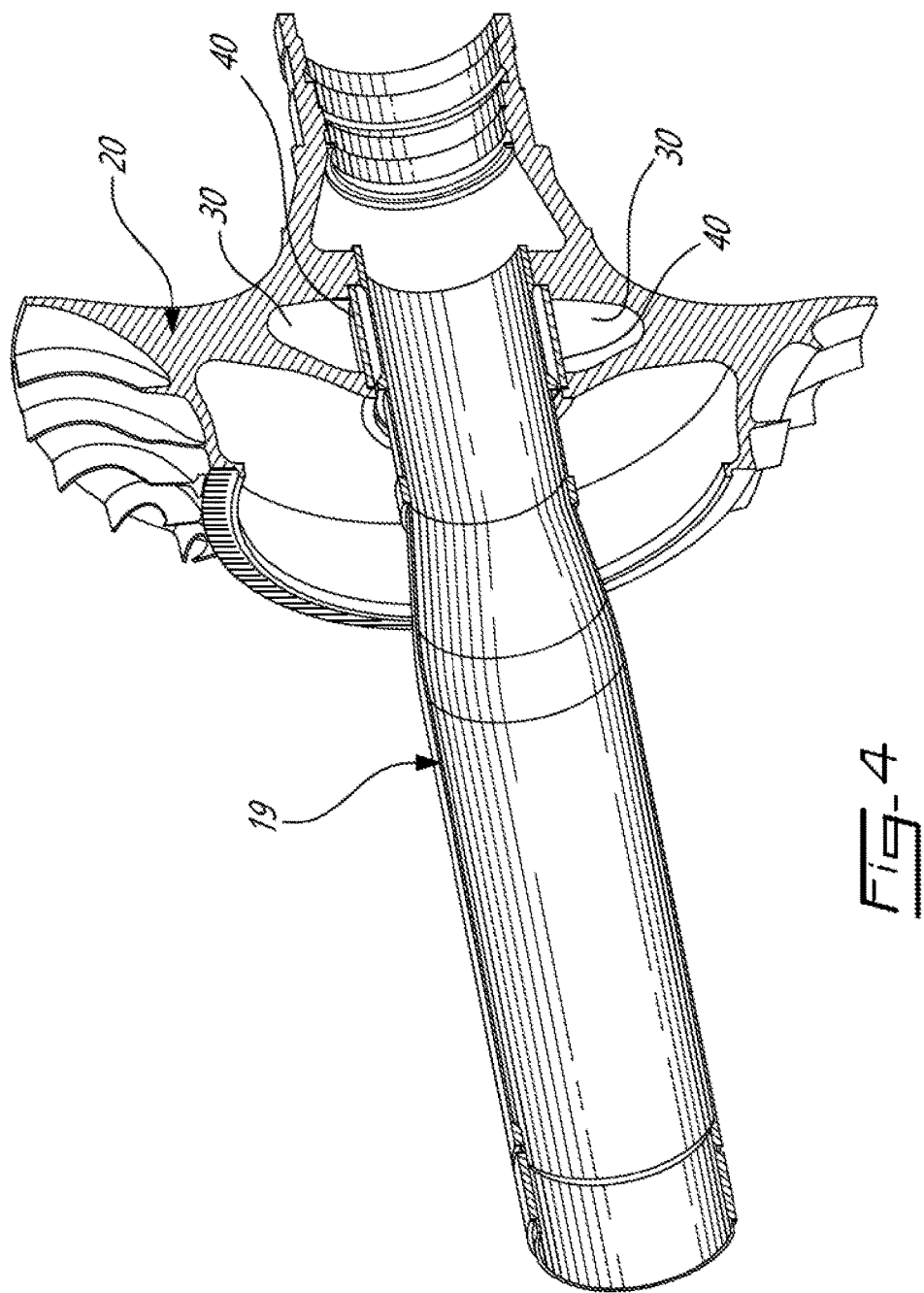
FIG. 4 is a perspective, axially sectioned, view of a gas turbine engine rotor and shaft assembly.
Figure 5:
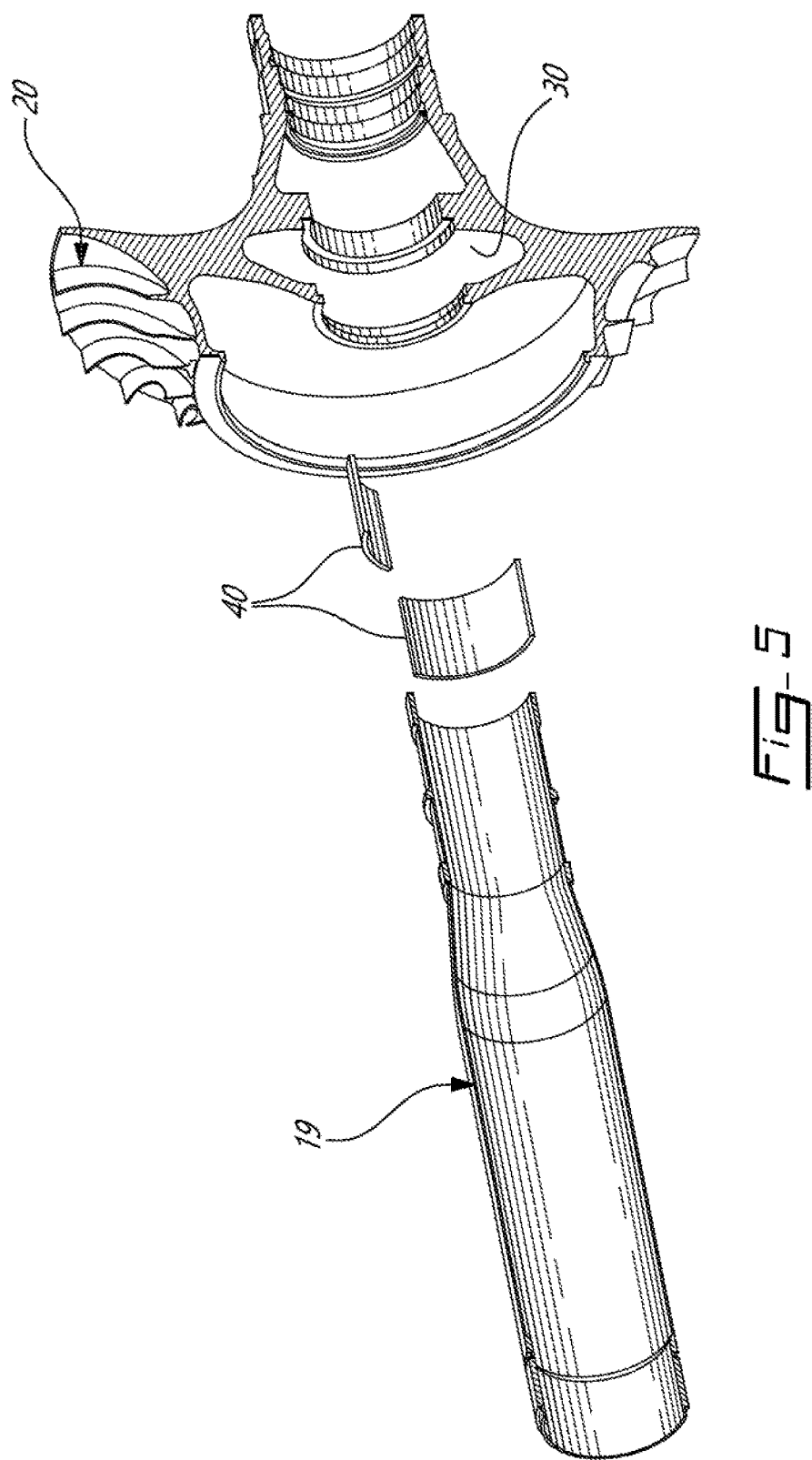
FIG. 5 is an exploded view of the rotor/shaft assembly of FIG. 4.

FIGS. 4 and 5 show more exemplary details of a possible embodiment, where the rotor 20 of FIG. 2A is shown mounted to a shaft 19 of the gas turbine engine 10 (FIG. 4), and exploded therefrom (FIG. 5), respectively, for additional clarity and completeness with respect to an embodiment.

The above description is meant to be exemplary only, and one skilled in the art will recognize that changes may be made to the embodiments described without departing from the scope of the invention disclosed. For example, the one or more structural plates and the body can be provided in various shapes or sizes, and can be manufactured using various processes. The longitudinal cross-section of the structural plate(s) can also be inclined relative to the axis rather than being relatively parallel thereto as shown in FIGS. 2A and 2B. In cases where more than one circumferentially spaced-apart structural plates are used, the forward annular flange seat and/or the rearward annular flange seat can include a plurality of circumferentially interspaced seat portions each being associated to a corresponding one of the structural plates. The rotor can be used as any suitable rotary component of a turbofan gas turbine engine or of any other gas turbine engine type which can have an axial bore or not. In alternate embodiments, the annular cavity can extend into the body from the rear or the front, in a partially or completely axial orientation, rather than extending into the body in the radially-outer direction from a hub, axial bore, or other radially-inwardly located annular opening; accordingly, in such other embodiments, the plate or plates can extend fully or partially in the radial orientation, or in any suitable orientation between the axial orientation and the radial orientation. The use of distinctly shaped seats are optional, as in some alternate embodiments, the plate or plates can be positioned directly at a suitable depth in the cavity. Still other modifications which fall within the scope of the present invention will be apparent to those skilled in the art, in light of a review of this disclosure, and such modifications are intended to fall within the scope of the appended claims.

What is claimed is:

1. A gas turbine engine rotor comprising a body having a solid-of-revolution-shaped portion centered around a rotation axis, the body having a bore extending axially along the rotation axis and configured for receiving a shaft therein, the bore defined within a peripheral surface of the body circumferentially extending around the rotation axis, the body defining an annular cavity extending between two opposite annular wall portions of the body, the two opposite annular wall portions extending away from radially-inner ends thereof and joining each other at a radially-outer end of the annular cavity, the radially-inner ends of the two opposite annular wall portions defining seats located radially outwardly from the peripheral surface and radially inwardly from the annular cavity, the annular cavity extending radially outwardly from the seats, the gas turbine engine rotor further having a plurality of structural plates circumferentially interspaced from one another by corresponding spacings, the plurality of structural plates extending radially relative to the rotation axis from inner surfaces facing the rotation axis to opposed outer surfaces, the plurality of structural plates having opposed ends extending axially along axial lengths of the seats and extending radially from the inner surfaces to the outer surfaces, the opposed ends mounted to and extending between the seats in the two opposite annular wall portions and forming an interference fit therewith, the opposed ends of the plurality of structural plates being entirely disposed radially between the peripheral surface and the seats relative to the rotation axis.

2. The gas turbine engine rotor of claim 1, further comprising an aperture in at least one of the plurality of structural plates providing fluid flow communication to and from the annular cavity across the at least one of the plurality of structural plates.

3. The gas turbine engine rotor of claim 1, wherein at least one of the corresponding spacings has a sufficient dimension to allow boroscopy inspection of the annular cavity therethrough from the bore.

4. The gas turbine engine rotor of claim 1, wherein the plurality of structural plates have a greater thermal expansion coefficient than the solid-of-revolution-shaped portion of the body in a manner to increase a compression stress of the interference-fit to force the two opposite annular wall portions away from one another when the body is subjected to a temperature rise.

5. The gas turbine engine rotor of claim 1, wherein each of the plurality of structural plates has a central portion and splayed legs extending from the central portion, the splayed legs reaching the seats, the central portion projecting radially inwardly relative to the rotation axis.

6. The gas turbine engine rotor of claim 5, wherein the central portion has a greater thickness than the splayed legs.

7. The gas turbine engine rotor of claim 1, wherein each of the plurality of structural plates has a length in an axial direction relative to the rotation axis and a height in a radial direction that is perpendicular to the axial direction, the length being greater than the height.

8. A gas turbine engine comprising a shaft adapted to rotate about a rotation axis and a rotor fixed to the shaft, the rotor including a body having a solid-of-revolution-shaped portion centered around the rotation axis, the body having a bore extending axially along the rotation axis and receiving the shaft therein, the bore defined within a peripheral surface of the body circumferentially extending around the rotation axis, the body having an annular cavity extending between two opposite annular wall portions of the body, the two opposite annular wall portions extending away from radially-inner ends thereof and joining each other at a radially-outer end of the annular cavity, the radially-inner ends of the two opposite annular wall portions defining seats located radially outwardly from the peripheral surface and radially inwardly from the annular cavity, the annular cavity extending radially outwardly from the seats, the rotor further having a plurality of structural plates circumferentially interspaced from one another by corresponding spacings, the plurality of structural plates extending radially relative to the rotation axis from inner surfaces facing the rotation axis to opposed outer surfaces, the plurality of structural plates having opposed ends extending axially along axial lengths of the seats and extending radially from the inner surfaces to the outer surfaces, the opposed ends mounted to and extending between the seats in the two opposite annular wall portions and forming an interference fit therewith, the opposed ends of the plurality of structural plates outside of the annular cavity and outside of the bore.

9. The gas turbine engine of claim 8, wherein the rotor further comprises an aperture in at least one of the plurality of structural plates providing fluid flow communication to and from the annular cavity across the at least one of plurality of structural plates.

10. The gas turbine engine of claim 8, wherein at least one of the corresponding spacings has a sufficient dimension to allow boroscopy inspection of the cavity therethrough from the bore.

11. The gas turbine engine of claim 8, wherein the plurality of structural plates have a greater thermal expansion coefficient than the solid-of-revolution-shaped portion of the body in a manner to increase the compression stress of the interference-fit to force the two opposite annular wall portions away from one another when the body is subjected to a temperature rise.

12. The gas turbine engine of claim 8, wherein each of the plurality of structural plates has a central portion and splayed legs extending from the central portion, the splayed legs reaching the seats, the central portion projecting radially inwardly relative to the rotation axis.

13. The gas turbine engine of claim 8, wherein each of the plurality of structural plates has a length in an axial direction relative to the rotation axis and a height in a radial direction that is perpendicular to the axial direction, the length being greater than the height.

14. A method of manufacturing a rotor of a gas turbine engine comprising:
providing a rotor body, the rotor body being solid and having a solid-of-revolution-shaped portion centered around a rotation axis of the rotor, the rotor body having a bore extending axially along the rotation axis and configured for receiving a shaft therein, the bore defined within a peripheral surface circumferentially extending around the rotation axis;
forming an annular cavity in the rotor body, the annular cavity extending between two wall portions of the rotor body, the two wall portions extending away from radially-inner ends thereof and joining each other at a radially-outer end of the annular cavity, forming seats in the radially-inner ends of the two wall portions, the seats located radially outwardly from the peripheral surface and radially inwardly from the annular cavity, the annular cavity extending radially outwardly from the seats; and
mounting a plurality of structural plates between the seats in the two wall portions with an interference fit, disposing opposed ends of the plurality of structural plates entirely radially between the peripheral surface and the seats relative to the rotation axis, the opposed ends extending axially along axial lengths of the seats and extending radially from inner surfaces to outer surfaces of the plurality of structural plates, and circumferentially interspacing the plurality of structural plates from one another by corresponding spacings.

15. The method of claim 14, further comprising providing the plurality of structural plates with a thermal expansion coefficient that is greater than that of the rotor body, in a manner to increase compression stress of the interference fit between the plurality of structural plates and the two wall portions, thereby forcing the two wall portions away from one another when the rotor body is subjected to a temperature increase.

16. The method of claim 14, wherein said forming the rotor body includes forming the bore;
said forming of the annular cavity is done in a manner that the annular cavity penetrates radially outwardly into the rotor body from the peripheral surface to form the two wall portions of the rotor body; and
further comprising forming the plurality of structural plates with splayed legs extending from a central portion, the splayed legs reaching the seats and the central portion projecting radially inwardly between the splayed legs.

17. The method of claim 14, further comprising providing the plurality of structural plates with a length in an axial direction relative to the rotation axis and a height in a radial direction relative to the rotation axis, the length being greater than the height.

* * * * *

UNITED STATES PATENT AND TRADEMARK OFFICE
CERTIFICATE OF CORRECTION

PATENT NO. : 10,385,695 B2
APPLICATION NO. : 14/459923
DATED : August 20, 2019
INVENTOR(S) : Farid Abrari, Nashed Youssef and Andrew Marshall It is certified that error appears in the above-identified patent and that said Letters Patent is hereby corrected as shown below:

On the Title Page

Item (72), Inventors please add the following:
DAVID MENHEERE

Signed and Sealed this
Seventh Day of January, 2020

Andrei Iancu
*Director of the United States Patent and Trademark Office*